United States Patent
Horiguchi et al.

(10) Patent No.: US 12,448,521 B2
(45) Date of Patent: Oct. 21, 2025

(54) NEAR-INFRARED-SHIELDING MATERIAL

(71) Applicant: Nippon Sheet Glass Company, Limited, Tokyo (JP)

(72) Inventors: Haruko Horiguchi, Mie (JP); Shinya Katagiri, Aichi (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 815 days.

(21) Appl. No.: 17/629,160

(22) PCT Filed: Jul. 8, 2020

(86) PCT No.: PCT/JP2020/026763
§ 371 (c)(1),
(2) Date: Jan. 21, 2022

(87) PCT Pub. No.: WO2021/014981
PCT Pub. Date: Jan. 28, 2021

(65) Prior Publication Data
US 2022/0267604 A1 Aug. 25, 2022

(30) Foreign Application Priority Data
Jul. 23, 2019 (JP) .................. 2019-135279

(51) Int. Cl.
*C09C 1/00* (2006.01)
*A61K 8/02* (2006.01)
(Continued)

(52) U.S. Cl.
CPC .......... *C09C 1/0024* (2013.01); *A61K 8/0266* (2013.01); *A61K 8/25* (2013.01);
(Continued)

(58) Field of Classification Search
CPC .......... C09C 1/0024; C09D 7/70; C09D 7/62; C09D 5/32; C09D 5/36; A61K 8/0266; A61K 8/25; A61K 8/29; A61Q 17/04
See application file for complete search history.

(56) References Cited

U.S. PATENT DOCUMENTS

| | | | |
|---|---|---|---|
| 6,689,205 B1 | 2/2004 | Brückner et al. | |
| 2018/0155551 A1* | 6/2018 | Horiguchi | C09D 7/40 |

(Continued)

FOREIGN PATENT DOCUMENTS

| | | |
|---|---|---|
| EP | 2348076 | 7/2011 |
| EP | 2664317 | 11/2013 |

(Continued)

OTHER PUBLICATIONS

International Search Report and Written Opinion issued for International Patent Application No. PCT/JP2020/026763, Date of mailing: Sep. 29, 2020, 12 pages including English translation of Search Report.

(Continued)

*Primary Examiner* — Jianfeng Song
(74) *Attorney, Agent, or Firm* — HSML P.C.

(57) ABSTRACT

A new material efficiently attenuating transmission of near-infrared light is provided. A provided near-infrared-shielding material includes a plurality of flaky particles, wherein each of the plurality of flaky particles includes a flaky substrate and a single-layer film formed on a principal surface of the flaky substrate, and the near-infrared-shielding material has a light reflectance of 40% or more between wavelengths of 800 nm and 1400 nm. The flaky substrate is, for example, a glass flake. The glass flake has an average thickness of, for example, 0.6 µm or less. The single-layer film includes, for example, titanium oxide and has an average thickness of, for example, 80 nm to 165 nm.

16 Claims, 8 Drawing Sheets

(51) Int. Cl.
    *A61K 8/25*         (2006.01)
    *A61K 8/29*         (2006.01)
    *A61Q 17/04*      (2006.01)
    *C09D 5/32*         (2006.01)
    *C09D 5/36*         (2006.01)
    *C09D 7/40*         (2018.01)
    *C09D 7/62*         (2018.01)

(52) U.S. Cl.
CPC ............... *A61K 8/29* (2013.01); *A61Q 17/04* (2013.01); *C09D 5/32* (2013.01); *C09D 5/36* (2013.01); *C09D 7/62* (2018.01); *C09D 7/70* (2018.01); *A61K 2800/621* (2013.01); *A61K 2800/651* (2013.01); *C01P 2004/20* (2013.01); *C01P 2004/54* (2013.01); *C01P 2004/84* (2013.01); *C09C 2200/102* (2013.01); *C09C 2200/301* (2013.01); *C09C 2200/302* (2013.01); *C09C 2210/10* (2013.01)

(56) References Cited

U.S. PATENT DOCUMENTS

2020/0190330 A1    6/2020    Nakamura
2020/0283635 A1    9/2020    Horiguchi

FOREIGN PATENT DOCUMENTS

| | | |
|---|---|---|
| JP | 106306203 | 11/1994 |
| JP | H0752335 A | 2/1995 |
| JP | H0999510 A | 4/1997 |
| JP | H10918830 | 7/1997 |
| JP | 2000119579 A | 4/2000 |
| JP | 2000517374 | 12/2000 |
| JP | 2001031421 | 2/2001 |
| JP | 2002138010 | 5/2002 |
| JP | 2003012962 | 1/2003 |
| JP | 2006299051 * | 11/2006 |
| JP | 2008083378 | 4/2008 |
| JP | 2008546880 | 12/2008 |
| JP | 2011153208 A | 8/2011 |
| JP | 2013530921 | 8/2013 |
| JP | 2016185904 | 10/2016 |
| JP | 2017171655 | 9/2017 |
| WO | 2007054379 | 5/2007 |
| WO | 2010024256 | 3/2010 |
| WO | 2011051122 A1 | 5/2011 |
| WO | 2011095447 A2 | 8/2011 |
| WO | 2012004562 | 1/2012 |
| WO | 2016194352 | 12/2016 |
| WO | 2018096936 | 5/2018 |
| WO | 2018186076 | 10/2018 |
| WO | 2018198294 | 11/2018 |

OTHER PUBLICATIONS

Extended European Search Report issued for European Patent Application No. 20843140.3, dated Jun. 23, 2023, 7 pages.

* cited by examiner

NEAR-INFRARED-SHIELDING MATERIAL

TECHNICAL FIELD

The present invention relates to a near-infrared-shielding material attenuating transmission of near-infrared light, and relates to a particle-shaped near-infrared-shielding material particularly suitable for use as materials of cosmetics and paints, materials of resin molded articles, and so on.

BACKGROUND ART

About half of the energy coming from the sun to the earth is infrared light. Thus, for efficient shielding against energy emitted from the sun, infrared light, particularly near-infrared light, needs to be shielded against. Fine particles of titanium oxide, zinc oxide, etc., particularly fine titanium oxide particles, are used as near-infrared-shielding materials. It is known that fine titanium oxide particles with an average particle diameter of about 1 μm have a high near-infrared reflectance. When used, fine titanium oxide particles serving as a near-infrared-shielding material are commonly dispersed in paints or films. Paints including shielding materials are applied to, for example, vehicles such as automobiles and roofing of buildings.

Effects of near-infrared light on the human body are becoming clearer by recent advances in research. Near-infrared light having a longer wavelength than that of visible light reaches deep layers of skin that extend from the dermis to the subcutaneous tissue, accelerating skin aging. To prevent this, a need for shielding materials against near-infrared light is increasing in the cosmetic field.

Patent Literature 1 proposes using a mixture of zinc oxide and titanium oxide that have individually defined average particle diameters as a near-infrared-shielding material for cosmetics. According to Patent Literature 1, this mixture makes problems such as a "white cast" on the skin less severe.

CITATION LIST

Patent Literature

Patent Literature 1: JP 2017-171655 A

SUMMARY OF INVENTION

Technical Problem

Development of near-infrared-shielding materials typified by fine titanium oxide particles is basically based on optimization of fine particle size and blending of different fine particles. However, it is difficult to satisfy a need for a wide variety of near-infrared-shielding materials only by these techniques. For example, visible light tends to be shielded against too by near-infrared-shielding fine titanium oxide particles. For cosmetics and paints, however, shielding against visible light is undesirable in some cases because a beautiful appearance, specifically colors in the visible region, is important. For applications other than cosmetics and paints, for example, for resin molded articles, a wider variety of near-infrared-shielding materials can uncover a non-conventional need. In view of such circumstances, the present invention aims to provide a new material efficiently attenuating transmission of near-infrared light.

Solution to Problem

Conventional near-infrared-shielding materials as disclosed in Patent Literature 1 take advantage of a shielding effect accompanying what is called Mie scattering. To use this shielding effect for near-infrared shielding, fine titanium oxide particles should be adjusted to an average particle diameter of about 1 μm. Unfortunately, near-infrared-shielding materials designed according to this are very limited in variety, have very limited visible light transmission and reflection properties, and have very limited beautiful appearances. The present inventors conceived attenuating transmission of near-infrared light using an interference effect and has completed the present invention as a result of an intensive study.

The present invention provides a near-infrared-shielding material including a plurality of flaky particles, wherein
    each of the plurality of flaky particles includes a flaky substrate and a single-layer film formed on a principal surface of the flaky substrate, and
    the near-infrared-shielding material has a light reflectance of 40% or more between wavelengths of 800 nm and 1400 nm.

In another aspect, the present invention provides a near-infrared-shielding material including a plurality of flaky particles, wherein
    each of the plurality of flaky particles includes a flaky substrate and a single-layer film formed on a principal surface of the flaky substrate,
    the flaky substrate is a glass flake,
    the glass flake has an average thickness of 0.6 μm or less,
    the single-layer film includes titanium oxide, and
    the single-layer film has an average thickness of 80 nm to 165 nm.

Advantageous Effects of Invention

The near-infrared-shielding material according to the present invention is suitable for efficiently attenuating incident light in the wavelength range of 800 nm to 1400 nm to which a large amount of energy emitted from sunlight belong. The near-infrared-shielding material according to the present invention is also suitable for producing various colors.

DESCRIPTION OF EMBODIMENTS

Hereinafter, embodiments of the present invention will be described. The following description is not intended to limit the present invention to specific embodiments.

<Near-Infrared-Shielding Material>

(Flaky Particles)

Figure 1:
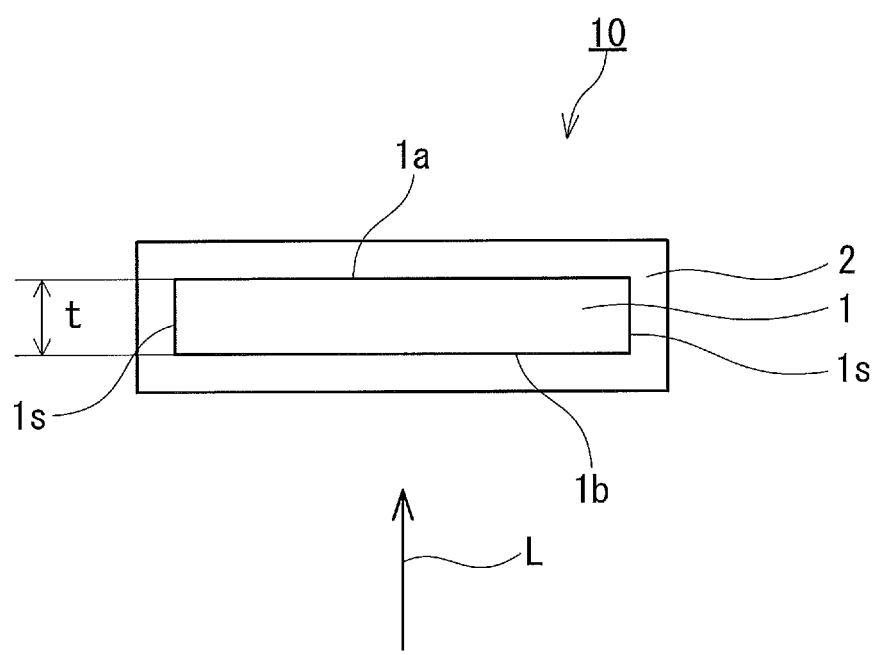
FIG. 1 is a schematic cross-sectional view showing an example of a flaky particle.

The near-infrared-shielding material of the present embodiment includes a plurality of flaky particles. Each of the flaky particles includes a flaky substrate and a single-layer film formed on at least a principal surface of the flaky substrate. FIG. 1 shows a schematic cross-section of the flaky particle. A flaky particle 10 includes a flaky substrate 1 and a single-layer film 2 formed on a pair of principal surfaces 1a and 1b and a side surface 1s. A thickness t of the flaky substrate 1 is a distance between the principal surfaces 1a and 1b. Reflecting the shape of the flaky substrate 1, the flaky particle 10 has a flaky shape by itself. It should be noted that the near-infrared-shielding material is not required to be composed only of the flaky particles.

(Flaky Substrate)

Figure 2:
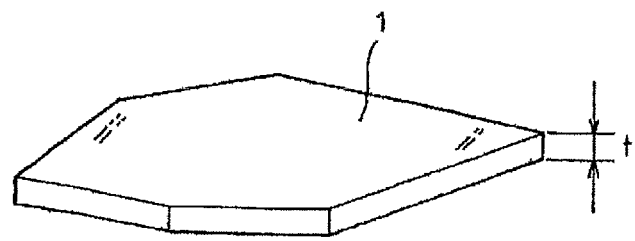
FIG. 2 is a perspective view showing an example of a flaky substrate.

The flaky substrate is a fine, plate-like thin piece which can be called, for example, a scaly substrate. FIG. 2 shows a typical embodiment of the flaky substrate 1. The flaky substrate is, for example, a glass flake, an alumina flake, mica, talc, or sericite. The flaky substrate is preferably a glass flake, an alumina flake, or mica. Mica may be natural mica or synthetic mica.

It is preferred that the flaky substrate have an average thickness of 0.6 μm or less, particularly 0.55 μm or less, for example 0.1 to 0.6 μm, and even 0.15 to 0.5 μm. The flaky substrate may have an average thickness of 0.4 μm or less. The use of a thin flaky substrate is advantageous for improving a shielding ability against light in a near-infrared region. The average thickness of the flaky substrate can be determined as the average of thicknesses of at least 50 flaky substrates. The thickness of each flaky substrate can be measured by observation using a scanning electron microscope (SEM).

It is preferred that the flaky substrate have an average particle diameter of 3 to 40 μm, particularly 4 to 25 μm, and, for example, 5 to 30 μm. The average particle diameter of the flaky substrate can be determined as a particle diameter (D50) at 50% by volume in a cumulative undersize distribution of light scattering-based particle sizes measured by laser diffractometry.

It is preferred that the flaky substrate have an aspect ratio of 15 or more, even 25 or more, and particularly 40 or more. The aspect ratio may be 70 or less and even 65 or less. An aspect ratio in such a range is advantageous for improving a shielding ability against light in a near-infrared region. The aspect ratio of the flaky substrate can be determined by dividing the average particle diameter by the average thickness.

The flaky substrate is particularly preferably a glass flake. A principal surface of a glass flake is smoother, and more apt to reflect light in the near-infrared region by interference of incident light L (refer to FIG. 1) and cause coloring of light in the visible region, than surfaces of crystalline particles such as mica. A glass composition of the glass flake is not particularly limited. For example, a glass composition containing silicon oxide as a main component and further containing other metal oxides such as aluminum oxide, calcium oxide, and sodium oxide can be used. The term "main component" is used herein to refer to a component whose content is highest in terms of mass. Specific examples of the glass composition include soda-lime glass, A-glass, C-glass, E-glass, ECR-glass, borosilicate glass, and aluminosilicate glass.

Figure 3:
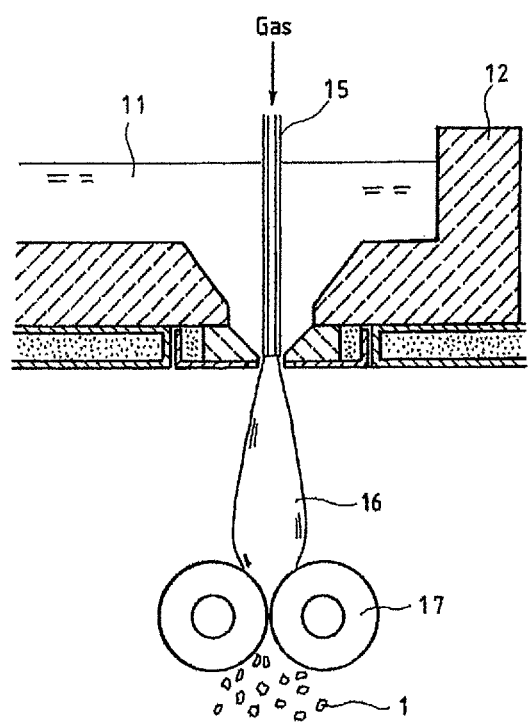
FIG. 3 is a schematic diagram showing an example of an apparatus for producing glass flakes.

FIG. 3 shows an example of an apparatus for producing glass flakes by a blow process. The production apparatus is equipped with a refractory tank furnace 12, a blowing nozzle 15, and pressing rolls 17. A glass raw material 11 is melted in the refractory tank furnace 12 (melting furnace) and is inflated into a balloon by a gas delivered through the blowing nozzle 15, so that hollow glass 16 is obtained. The hollow glass 16 is crushed by the pressing rolls 17 to obtain a glass flake 1. The thickness of the glass flake 1 can be controlled by adjusting, for example, the speed of pulling the hollow glass 16 and the flow rate of the gas delivered through the blowing nozzle 15. The particle diameter of the glass flake 1 can be controlled by adjusting, for example, shaping, crushing, and classification conditions for the glass flake.

Figure 4:
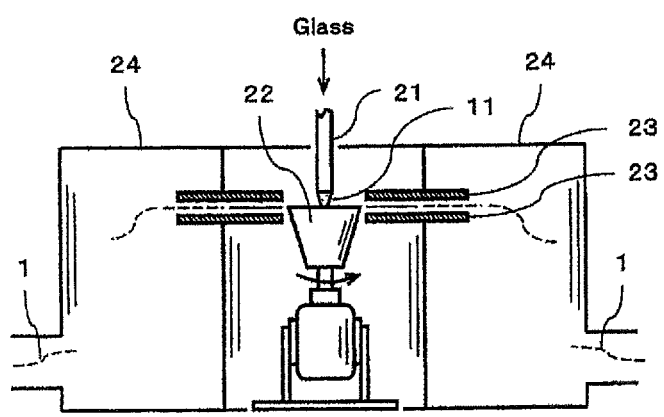
FIG. 4 is a schematic diagram showing another example of an apparatus for producing glass flakes.

FIG. 4 shows an example of an apparatus for producing glass flakes by a rotary process. The apparatus is equipped with a rotary cup 22, a pair of annular plates 23, and an annular cyclone collector 24. A molten glass raw material 11 is poured into the rotary cup 22 through a nozzle 21, centrifugally flows out from the upper edge of the rotary cup 22 in a radial manner, and is then drawn and carried into the annular cyclone collector 24 through the gap between the annular plates 23 by airflow. While passing through the annular plates 23, the glass is cooled and solidified into a thin film, which is then crushed into fine pieces to give a glass flake 1. The thickness of the glass flake 1 can be controlled by adjusting, for example, the distance between the annular plates 23 and the velocity of the airflow. The particle diameter of the glass flake 1 can be controlled by adjusting, for example, shaping, crushing, and classification conditions for the glass flake.

(Single-Layer Film)

The single-layer film is composed of a single layer and is formed to cover at least one pair of the principal surfaces of the flaky substrate. The single-layer film does not include a plurality of layers and thus has no interface therein forming a boundary between layers. An island-like matter attaching to a boundary between the film and the substrate or a surface of the film is not a "layer" unless the island-like matter extends along and entirely cover the boundary or the surface. A multilayer film in which a high refractive index layer and a low refractive index layer are alternately stacked is commonly used to reflect light in a relatively wide wavelength region such as the near-infrared region. However, a study by the present inventors has revealed that light in the near-infrared region can be efficiently attenuated with the use of the single-layer film. Replacement of a multilayer film with the single-layer film can reduce a huge amount of cost and time required for film formation.

The single-layer film includes, for example, at least one oxide selected from titanium oxide, silicon oxide, aluminum oxide, iron oxide, zinc oxide, tin oxide, zirconium oxide, cerium oxide, nickel oxide, chromium oxide, and vanadium oxide, and preferably includes titanium oxide as its main component. For simplification, a single-layer film including titanium oxide as its main component is hereinafter simply referred to as "titanium oxide film".

Titanium oxide has three types of crystal structures, namely the anatase-type, brookite-type, and rutile-type structures, and anatase-type titanium oxide and rutile-type titanium oxide are industrially manufactured. The rutile-type structure is preferred among the crystal structures of titanium oxide. Rutile-type titanium oxide has a low photocatalytic activity and the highest refractive index.

Formation of a rutile-type titanium oxide film on the flaky substrate may be carried out according to a method disclosed, for example, in JP 2001-031421 A or JP 2003-012962 A. In the method disclosed in these patent publications, rutile-type titanium oxide is precipitated on glass flakes in a solution containing a titanium compound such as titanium tetrachloride, and thus a film is formed on each glass flake. More specifically, precipitation of rutile-type titanium oxide on the glass flakes can be caused by adding an alkaline compound or an alkaline solution to the titanium compound-containing solution having a temperature of 55 to 85° C. and a pH of 1.3 or less. Preliminarily attaching tin or a tin compound to the glass flakes facilitates precipitation of rutile-type titanium oxide. With the use of this method, a rutile-type titanium oxide film can be formed without the need for heating for crystal transformation.

It is preferred that the single-layer film including titanium oxide have an average thickness of 80 nm to 165 nm, even 90 nm to 160 nm, particularly 95 nm to 140 nm, and more particularly 100 nm to 120 nm. The reflectance of light in the near-infrared region can be sufficiently increased by adjusting the average thickness of the single-layer film within an appropriate range. Controlling the thickness of the single-layer film not to be too small makes it easy to maintain a high reflectance on a longer wavelength side of the near-infrared region.

An orangish color can be obtained when the titanium oxide film has a thickness of about 100 nm to 120 nm. An orangish color is suitable for cosmetics applied to the skin. Cosmetics of this type, in particular, need a near-infrared-shielding effect. The near-infrared-shielding material including the titanium oxide film having a thickness in the above range is particularly suitably included in cosmetics, typically facial cosmetics, applied to the skin.

Glittering reflected light produced by the flaky particles can create an impressive decorative effect by combination of a color other than an orangish color. For example, a reddish interference color can be obtained when the titanium oxide film formed on the flaky substrate has a thickness of about 120 to 140 nm, and a bluish interference color can be obtained when the titanium oxide film formed on the flaky substrate has a thickness of about 150 to 165 nm. The near-infrared-shielding effect can be improved also by appropriately adjusting the thickness of the flaky substrate in these thickness ranges. The near-infrared-shielding material producing a bluish or reddish color is particularly suitably included in makeup cosmetics. Meanwhile, a greenish interference color can be obtained when the titanium oxide film has a thickness of more than 165 nm. However, the reflectance of the flaky substrate on which the titanium oxide film having a thickness in this range is formed is less than 40% on a shorter wavelength side of the near-infrared region even when the thickness of the flaky substrate is adjusted.

Unlike fine titanium oxide particles which are used for near-infrared shielding and whose reflected light color is limited to a whitish color, the near-infrared-shielding material of the present embodiment can provide various reflected colors. This can be an advantageous characteristic not only when the near-infrared-shielding material of the present embodiment is used for cosmetics but also when used for paints and other products.

(Fine Particles)

The flaky particle of the near-infrared-shielding material of the present embodiment may be a flaky particle in which fine particles are dispersed at an interface between the flaky substrate and the single-layer film and/or over a surface of the single-layer film. Near-infrared-shielding properties and the hue and vividness of reflected light can be adjusted by light absorption and scattering by the attached fine particles.

The fine particles may be fine metal particles or fine non-metal particles. The fine particles may be fine inorganic compound particles or fine organic compound particles. Examples of the fine metal particles include fine gold particles, fine platinum particles, and fine silver particles. The fine metal particles are not limited to these, and other fine particles than these may be used according to desired properties.

The average particle diameter of the fine particles is not particularly limited, and is, for example, 1 nm to 50 nm or even 5 nm to 30 nm. The fine particles may be attached in an amount of 0.05 to 1% or even about 0.1 to 0.6% on a mass basis relative to the total mass of the flaky substrate and the single-layer film.

It is often necessary in a field of cosmetics to make a minor adjustment of an orangish color, and the fine particles are particularly useful in this respect. The fine particles suitable for production and minor adjustment of orange's neighboring color tone are made of at least one selected from silver, iron oxide, gold, and synthetic organic dyes defined as certified dyes, and are particularly made of silver and/or iron oxide. The certified dyes, specified by the Ministry of Health, Labour and Welfare in 1996, are synthetic organic dyes (tar dyes) allowed to be used in medicines, quasi-drugs, and cosmetics. For example, Red 2, Red 102, Red 202, Yellow 4, Yellow 5, and Orange 205 can be used for production and minor adjustment of orange's neighboring color tone. As shown in examples described later, lightness L* of an orangish color can be adjusted to 60 or more, 65 or more, or even 70 or more by attachment of the fine particles. Although a detailed description is omitted, the fine particles are useful in adjusting a color, regardless of tones and applications. For example, Blue 1, ultramarine, and the like can be used to adjust a blueish color.

(Optical Properties)

The near-infrared-shielding material of the present embodiment can have a light reflectance of 40% or more, 41% or more, 42% or more, 43% or more, 45% or more, even 47% or more, particularly 50% or more, in some cases, 55% or more, even 57% or more, and more particularly 60% or more between wavelengths of 800 nm and 1400 nm. Light with a longer wavelength in the above wavelength range reaches deeper into the skin. Taking this into account, it is preferred that the light reflectance be 47% or more, even 50% or more, particularly 55% or more, in some cases, 57% or more, or more particularly 60% or more between wavelengths of 1000 nm and 1400 nm. In general, the term "near-infrared region" can refer to a wavelength range up to about 2.5 μm. Herein, however, the wavelength range from 800 nm to 1400 nm is defined as a near-infrared region because most of the energy emitted from the sun is at a wavelength of about 1.4 μm or less.

Some amount of near-infrared light with a particular wavelength is absorbed by, for example, moisture in the air before it reaches to the surface of the earth. Near-infrared light with a wavelength around 1000 nm is, however, hardly attenuated by absorption by molecules in the air. Taking this into account, it is preferred that the near-infrared-shielding material of the present embodiment have a light reflectance of 45% or more, even 47% or more, particularly 50% or more, in some cases, 55% or more, even 57% or more, more particularly 60% or more, and particularly 62% or more at a wavelength of 1000 nm.

A reflected color produced by the near-infrared-shielding material of the present embodiment is not particularly limited and is, for example, at least one of orangish, reddish, and bluish colors. In the case where the shielding properties in the near-infrared region should be given weight, an embodiment is preferred in which an orangish and/or reddish reflected color can be obtained. These reflected colors can have such high chroma that the reflected colors are expressed by a C* value of 10 or more, even 15 or more, and particularly 20 or more in an L*C*h color system. The near-infrared-shielding material of the present embodiment can have a C* value of 10 or more and a reflectance of 50% or more between wavelengths of 800 nm and 1400 nm.

Herein, color description is defined as follows on the basis of the L*C*h color system. An orangish color is expressed by an h value of 45 to 88, even 55 to 87, and particularly 65 to 86. A color with a heavy yellow tint is also included in these ranges of h; herein, a range of colors particularly demanded in a facial cosmetic application is defined as orangish colors. A reddish color is expressed by an h value of 0 or more and less than 45 or an h value of 315 or more and less than 360. A bluish color is expressed by an h value of 225 or more and less than 315. It should be noted that a precondition for achieving the above colors is a certain level of chroma C*, i.e., a C* value of 10 or more. With a low C* value, a color would be perceived by the eye as silver, white, or the like even when a hue angle h is in the above range.

However, the near-infrared-shielding material of the present embodiment can have a silver or whitish reflected color having a chroma C* of less than 10. Such a reflected color can be achieved, for example, by mixing different types of flaky particles having different reflected colors. The different types of flaky particles can have, as their single-layer films, titanium oxide films having different thicknesses from each other. It is preferred that the titanium oxide films of this case also have an average thickness of 80 to 165 nm. In this preferred embodiment, the light reflectance between wavelengths of 800 nm and 1400 nm can be maintained at 50% or more.

<Applications>

The near-infrared-shielding material of the present embodiment can be applied to a wide variety of applications in which shielding against near-infrared light is required. Preferred applications are cosmetics and paints shown below as examples, but not limited to these. The near-infrared-shielding material of the present embodiment can be included in various compositions used for other applications. In other words, the near-infrared-shielding material of the present embodiment can be used as a near-infrared-shielding composition including the near-infrared-shielding material of the present embodiment.

(Cosmetics)

The near-infrared-shielding material of the present embodiment is suitably used particularly as a material of cosmetics. The cosmetics are, for example, but not particularly limited to, facial cosmetics, makeup cosmetics, and hair cosmetics. The cosmetics including the near-infrared-shielding material of the present embodiment are particularly preferably facial cosmetics such as foundation and face powder. Facial cosmetics have a particularly strong need for a material for near-infrared shielding. The near-infrared-shielding material of the present embodiment can also provide a beautiful reflected color. From this point of view, the near-infrared-shielding material of the present embodiment is also suitably included in makeup cosmetics such as eye shadows, nail enamels, eyeliners, mascaras, lipsticks, and fancy powders. The forms of the cosmetics are not particularly limited, and examples thereof include powders, cakes, pencils, sticks, ointments, liquids, emulsions, and creams.

(Paints)

The near-infrared-shielding material of the present embodiment is also suitably used as a material of paints. The paints are, for example, but not particularly limited to, paints for vehicles, paints for ships, paints for aircrafts, paints for buildings, paints for civil engineering structures, paints for building materials, paints for electrical appliances, paints for resin molded articles, paints for paper processing, and paints for film processing. A typical paint for vehicles is a paint for automobiles. The paints may be what is called, for example, a coating agent. An application method is not particularly limited.

(Other Applications)

The near-infrared-shielding material of the present embodiment may be used in other applications than the cosmetics and the paints, for example, may be included in resin molded articles such as resin parts, resin containers, and resin films. The near-infrared-shielding material of the present embodiment is suitably used for compositions or molded articles used in the form of coatings or parts of products which are especially for outdoor use or which are expected to be given a decorative effect attributed to glittering reflected light.

<Coated Article/Paint Film>

Near-infrared light can be effectively shielded against by the near-infrared-shielding material of the present embodiment in a painted article including a paint applied thereto. In other words, the near-infrared-shielding material of the present embodiment can be used as a painted article including the near-infrared-shielding material of the present embodiment. In the painted article, the paint film including the near-infrared-shielding material and formed on any of the objects shown as examples in the description of the paint application can provide a near-infrared-shielding function and, in some cases, a beautiful reflected color. The paint film may be a single-layer film or a multilayer film. Hereinafter, a paint film for vehicles that is often formed as a multilayer film is shown as an example.

(Paint Film for Vehicles)

Figure 9:
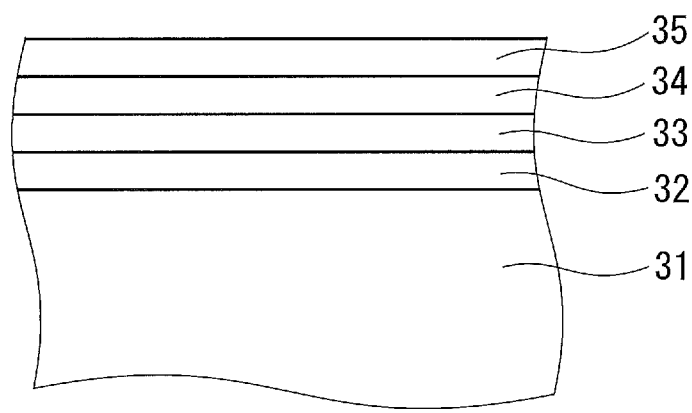
FIG. 9 is a cross-sectional view showing an example of a configuration of a multilayer paint film for vehicles.

FIG. 9 shows an example of a configuration of a paint film for vehicles. A paint film whose cross-section is shown in FIG. 9 is a multilayer film formed on a base 31. The paint film includes, from the base 31 side, an electrodeposition paint film 32, a middle coat paint film 33, a base paint film 34, and a clear paint film 35 in this order. The base 31 is, for example, a steel plate such as a cold-rolled steel plate or a hot-dip galvanized steel plate. The electrodeposition coating 32 is formed, for example, to impart rust-resistance or to shield an undercoat. The electrodeposition coating 32 may be a cationic electrodeposition coating. A cationic electrodeposition paint includes, for example, a cationic matrix resin, a curing agent, and a pigment. The middle coat paint film 33 is formed, for example, to prevent stone chips or to improve undercoat-shielding properties. The middle coat paint film 33 includes, for example, a paint-film-forming resin, a pigment, and an additive. The paint-film-forming resin is, for example, an acrylic resin, a polyester resin, or an alkyd resin. A material, such as titanium oxide or iron oxide, capable of reducing light transmission is used as the pigment. A surface conditioner, an ultraviolet absorber, a viscosity control agent, or the like is used as the additive.

The base paint film 34 and the clear paint film 35 are sometimes collectively called a topcoat paint film. The topcoat paint film is formed chiefly to impart a desirable beautiful appearance to vehicle bodies. The base paint film 34 includes, for example, a paint-film-forming resin, a pigment, and an additive. The paint-film-forming resin is, for example, an acrylic resin, a polyester resin, an alkyd resin, or an amino resin. Examples of the additive are as described above. A coloring pigment producing a desirable reflected color is used as the pigment. Examples of the coloring pigment include aluminum flakes and fine titanium oxide particles. Fine titanium oxide particles are sometimes used as a near-infrared-shielding material. A glitter pigment taking advantage of a color produced by light interference can be additionally used as the pigment. The clear paint film 35 includes, for example, a paint-film-forming resin and an additive. The paint-film-forming resin is, for example, an acrylic resin, a polyester resin, an alkyd resin, or a urethane resin. Examples of the additive are as described above.

Since the near-infrared-shielding material of the present embodiment can produce a color by light interference and achieve near-infrared shielding, the near-infrared-shielding material of the present embodiment is particularly suitably added to the base paint film 34.

The paint film shown in FIG. 9 as an example is merely an example. The near-infrared-shielding material of the present embodiment may be, for example, included in a paint film formed on a base made of a resin or an inorganic material. Alternatively, the near-infrared-shielding material of the present embodiment may be included in a paint film being a multilayer film including more layers or less layers than in the above example or a single-layer film.

(Effect of Thickness of Substrate in Paint Film)

Figure 10A:
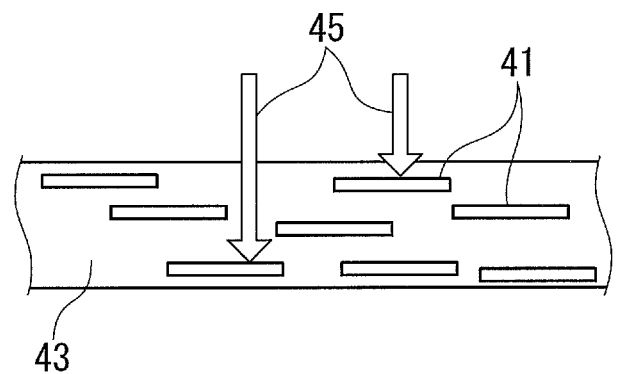
FIG. 10A is a cross-sectional view showing an example of a paint film in which a near-infrared-shielding material having a relatively small thickness is dispersed.
Figure 10B:
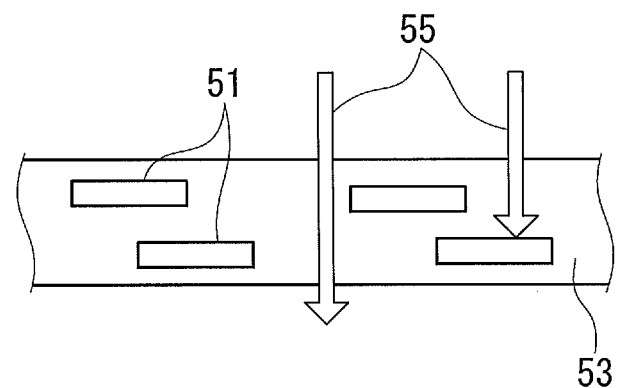
FIG. 10B is a cross-sectional view showing an example of a paint film in which a near-infrared-shielding material having a relatively large thickness is dispersed.

FIGS. 10A and 10B schematically show paint films including the near-infrared-shielding material of the present embodiment. Near-infrared light 45 and 55 incident on paint film 43 and 53 are shielded against by near-infrared-shielding materials 41 and 51 dispersed in the paint films 43 and 53. It can be understood by comparison between FIGS. 10A and 10B that when the amounts of the included near-infrared-shielding materials 41 and 51 are the same, the near-infrared-shielding material 41 which is relatively thin is more advantageous in terms of shielding against the near-infrared light 45 and 55 than the near-infrared-shielding material 51 which is relatively thick. The near-infrared-shielding material 41 having a relatively high aspect ratio is more advantageous in terms of shielding against the near-infrared light 45 and 55 than the near-infrared-shielding material 51 having a relatively low aspect ratio. Here, the description is about paint films; the same can be said when the near-infrared-shielding material of the present embodiment is included, for example, in cosmetics and resin molded articles.

<Comparison with Other Near-Infrared-Shielding Film>

A silver coat (metal thin film layer), a multilayer film in which a metal thin film layer is disposed between dielectric layers, a film in which a high refractive index layer and a low refractive index layer are alternately stacked, etc. are known as a film for near-infrared shielding. Unfortunately, costs of production and raw materials of these films are high. A metal thin film layer can be a deteriorating factor for electric wave transmission properties of vehicle bodies, the electric wave transmission properties becoming more and more important properties of automobiles of recent years. The near-infrared-shielding material of the present embodiment is also suitable for maintaining electric wave transmission properties of vehicle bodies when included in a film formed of a material that is free of metals or even when included in a film including a metal at a content of 5% or less, 1% or less, or, in some cases, less than 0.1% on a mass basis. In view of securing electric wave transmission properties and achieving near-infrared shielding, the near-infrared-shielding material of the present embodiment is suitably included in a paint film formed on a non-metal base or in a composition in which the metal content is limited to the above range on a mass basis. Examples of the material of the non-metal base include a resin and glass.

Hereinafter, the near-infrared-shielding material of the present embodiment will be described in more detail by Examples. Examples given below are not offered to limit the present invention, either.

EXAMPLE 1

A titanium oxide film having a thickness of about 110 nm was formed on a surface of a glass flake having an average thickness of 0.3 μm and an average particle diameter of 15 μm by a liquid-phase method. The liquid-phase method was carried out in accordance with a method in JP 2003-012962 A. The titanium oxide film formed on the surface of the glass flake was able to be confirmed by observation with a SEM. A near-infrared-shielding material (Sample 1) formed of a plurality of flaky particles was obtained in this manner. For Sample 1, an orangish interference color was seen.

EXAMPLE 2

An iron oxide dispersion WD-IOR50 (manufactured by Daito Kasei Kogyo Co., Ltd.) was diluted with pure water to a pigment concentration of 1.0%. An amount of 35 g of this 1.0% dispersion was put in a beaker along with 1000 g of pure water and 70 g of the flaky particles produced as Sample 1. Hydrochloric acid was added to adjust the pH to 2.0 to 4.5 while the dispersion was being stirred in the beaker using a stirring blade. Stirring then continued for 10 minutes. After that, the flaky particles were separated from the supernatant by filtration and dried at 180° C. for 12 hours. A near-infrared-shielding material (Sample 2) was obtained in this manner. For Sample 2, an orangish interference color was seen.

EXAMPLE 3

Glass flakes having an average thickness of 0.5 μm and an average particle diameter of 25 μm were prepared. A flaky particle A including a titanium oxide film having a thickness of about 110 nm, a flaky particle B including a titanium oxide film having a thickness of about 160 nm, and a flaky particle C including a titanium oxide film having a thickness of about 175 nm were obtained by forming each titanium oxide film on a surface of the glass flake in the same manner as in Example 1. Next, the flaky particles A, B, and C were mixed at a ratio of 51% to 43% to 6% on a mass basis. A near-infrared-shielding material (Sample 3) was obtained in this manner. For Sample 3, a silver interference color having a chroma C* of less than 10 was seen.

EXAMPLE 4

A near-infrared-shielding material (Sample 4) was obtained in the same manner as in Example 1, except that glass flakes having an average thickness of 0.4 µm and an average particle diameter of 18 µm were used. For Sample 4, an orangish interference color was seen.

EXAMPLE 5

A near-infrared-shielding material (Sample 5) was obtained in the same manner as in Example 1, except that glass flakes having an average thickness of 0.4 µm and an average particle diameter of 10 µm were used. For Sample 5, an orangish interference color was seen.

EXAMPLE 6

A near-infrared-shielding material (Sample 6) was obtained in the same manner as in Example 1, except that glass flakes having an average thickness of 0.5 µm and an average particle diameter of 25 µm were used and the titanium oxide film formed had a thickness of about 130 nm. For Sample 6, a reddish interference color was seen.

EXAMPLE 7

A near-infrared-shielding material (Sample 7) was obtained in the same manner as in Example 1, except that glass flakes having an average thickness of 0.5 µm and an average particle diameter of 25 µm were used and the titanium oxide film formed had a thickness of about 160 nm. For Sample 7, a bluish interference color was seen.

EXAMPLE 8

A near-infrared-shielding material (Sample 8) was obtained in the same manner as in Example 1, except that glass flakes having an average thickness of 0.5 µm and an average particle diameter of 25 µm were used and the titanium oxide film formed had a thickness of about 90 nm. For Sample 8, a yellowish interference color was seen.

COMPARATIVE EXAMPLE 1

A near-infrared-shielding material (Sample 9) was obtained in the same manner as in Example 1, except that glass flakes having an average thickness of 0.5 µm and an average particle diameter of 25 µm were used and the titanium oxide film formed had a thickness of about 70 nm. For Sample 9, a silver interference color was seen.

COMPARATIVE EXAMPLE 2

A near-infrared-shielding material (Sample 10) was obtained in the same manner as in Example 1, except that glass flakes having an average thickness of 1.3 µm and an average particle diameter of 18 µm were used. For Sample 10, an orangish interference color was seen.

EXAMPLE 9

A near-infrared-shielding material (Sample 11) was obtained in the same manner as in Example 1, except that glass flakes having an average thickness of 0.5 µm and an average particle diameter of 25 µm were used and the titanium oxide film formed had a thickness of about 110 nm. For Sample 11, an orangish interference color was seen.

COMPARATIVE EXAMPLE 3

A near-infrared-shielding material (Sample 12) was obtained in the same manner as in Example 1, except that glass flakes having an average thickness of 0.5 µm and an average particle diameter of 25 µm were used and the titanium oxide film formed had a thickness of about 170 nm. For Sample 12, a greenish interference color was seen.

(Measurement of Reflected Color)

Coated articles were produced using powders of Samples 1 to 10 each dispersed in a transparent acrylic resin. A film applicator (Doctor Blade manufactured by YASUDA SEIKI SEISAKUSHO, LTD.) was used to produce the coated articles. A coating composition loaded in the film applicator was prepared by mixing each powder with a transparent acrylic resin paint (N Acryl Auto Clear Super manufactured by NIPPON PAINT Co., Ltd.) so that the content of the powder would be 3 mass % of the total mass. The coating composition was applied to a piece of black paper and dried at ordinary temperature. The paint film, which was formed to a thickness of 9 mil (approximately 228.6 µm), had a thickness of 70 to 80 µm after the drying. The reflectance of the used transparent acrylic resin paint is substantially 0 in the near-infrared region.

The brightness L*, the chroma C*, and the hue angle h of each of the formed coated articles were measured using a chroma meter CR-400 (manufactured by KONICA MINOLTA, INC.). The illuminant used is illuminant D65.

(Measurement of Reflectance of Near-Infrared Light)

Paint films having the same thickness as described above were formed in the same manner as described above, except that the coating compositions were applied to PET films. A small piece of about 25 mm square was cut out of each of the formed coated articles. The small piece was measured for a spectral reflectance using a spectrophotometer (a spectrophotometer UV-2600 manufactured by Shimadzu Corporation). An incident angle with respect to a surface of the PET film was 8°. Before the measurement, a piece of black paper was placed behind and in contact with the PET film.

Figure 5:
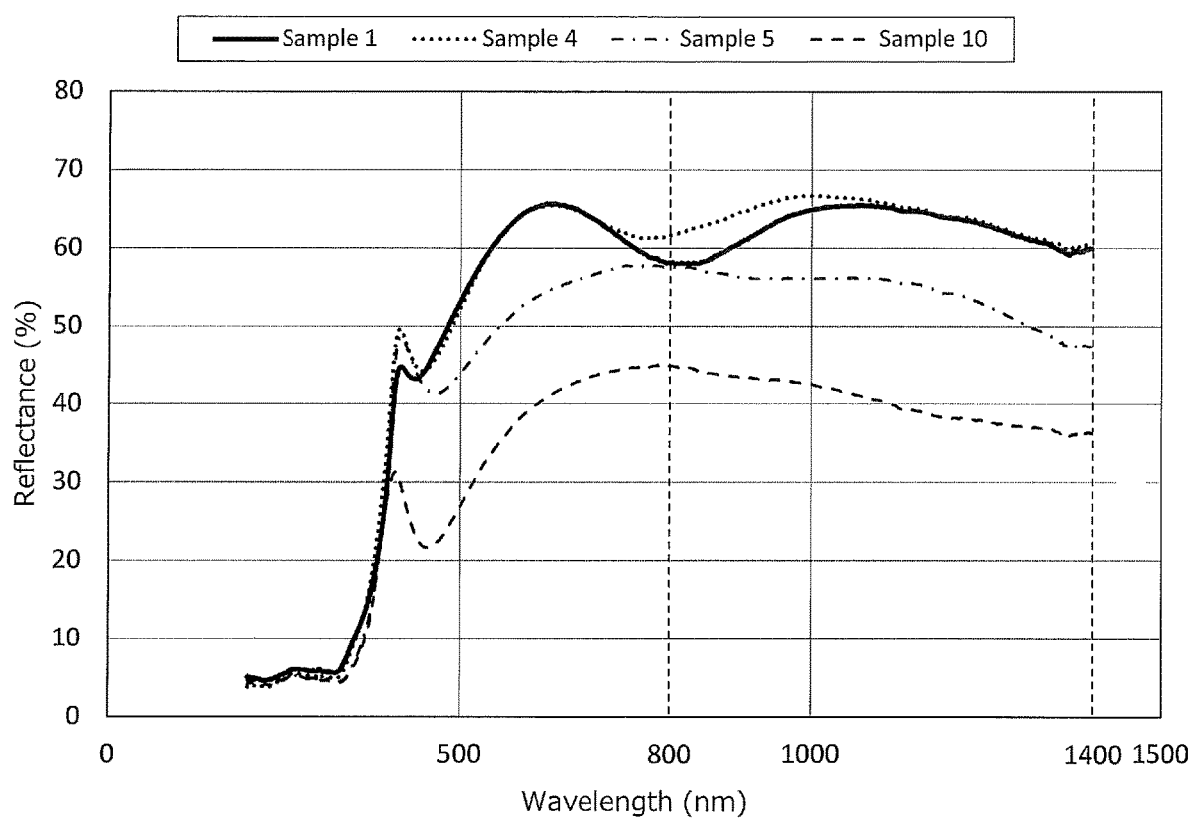
FIG. 5 shows spectral reflectance curves of Sample 1 (thickness: 0.3 μm; ratio: 50), Sample 4 (thickness: 0.4 μm; ratio: 45), Sample 5 (thickness: 0.4 μm; ratio: 25), and Sample 10 (thickness: 1.3 μm; ratio: 14) including titanium oxide films having the same thickness (110 nm) and glass flakes having different thicknesses and aspect ratios.
Figure 6:
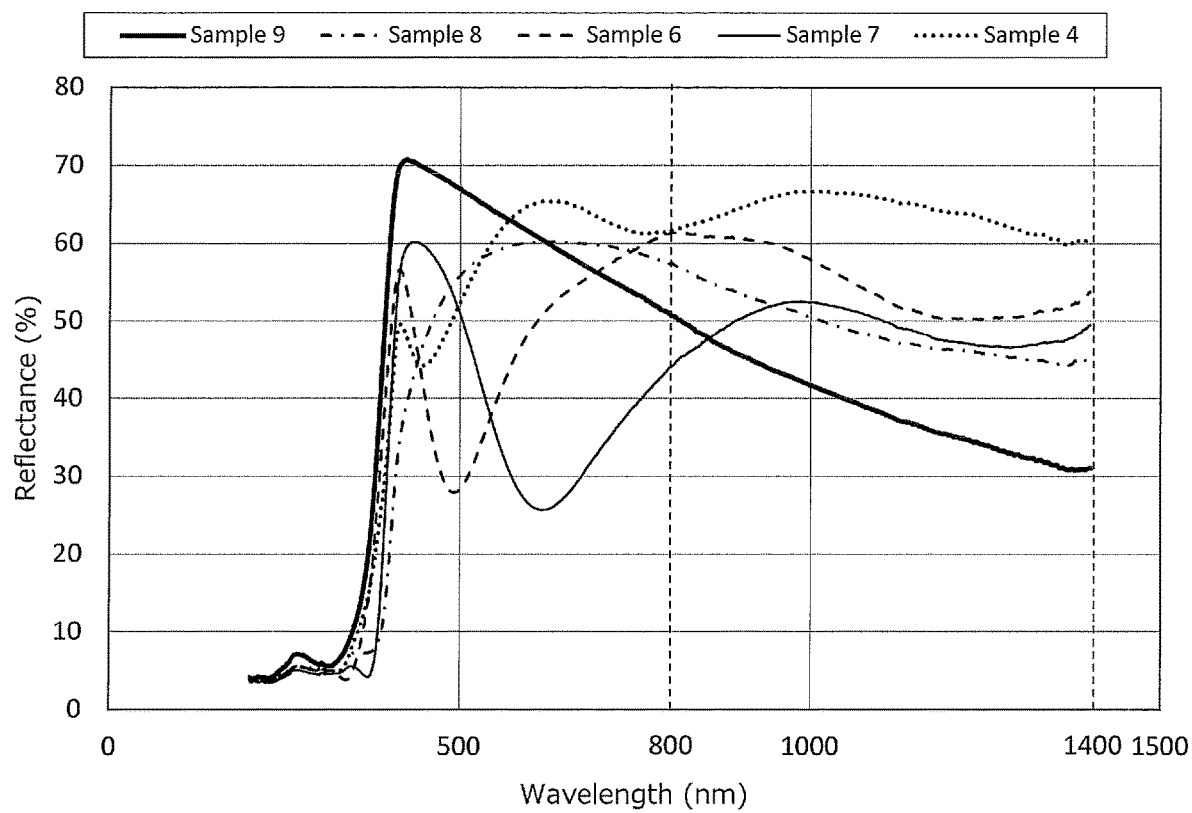
FIG. 6 shows spectral reflectance curves of Sample 9 (titanium oxide thickness: 70 nm), Sample 8 (90 nm), Sample 4 (110 nm), Sample 6 (130 nm), and Sample 7 (160 nm) including titanium oxide having different thicknesses and glass flakes having almost the same thicknesses (0.4 to 0.5 μm) and aspect ratios (45 to 50).
Figure 7:
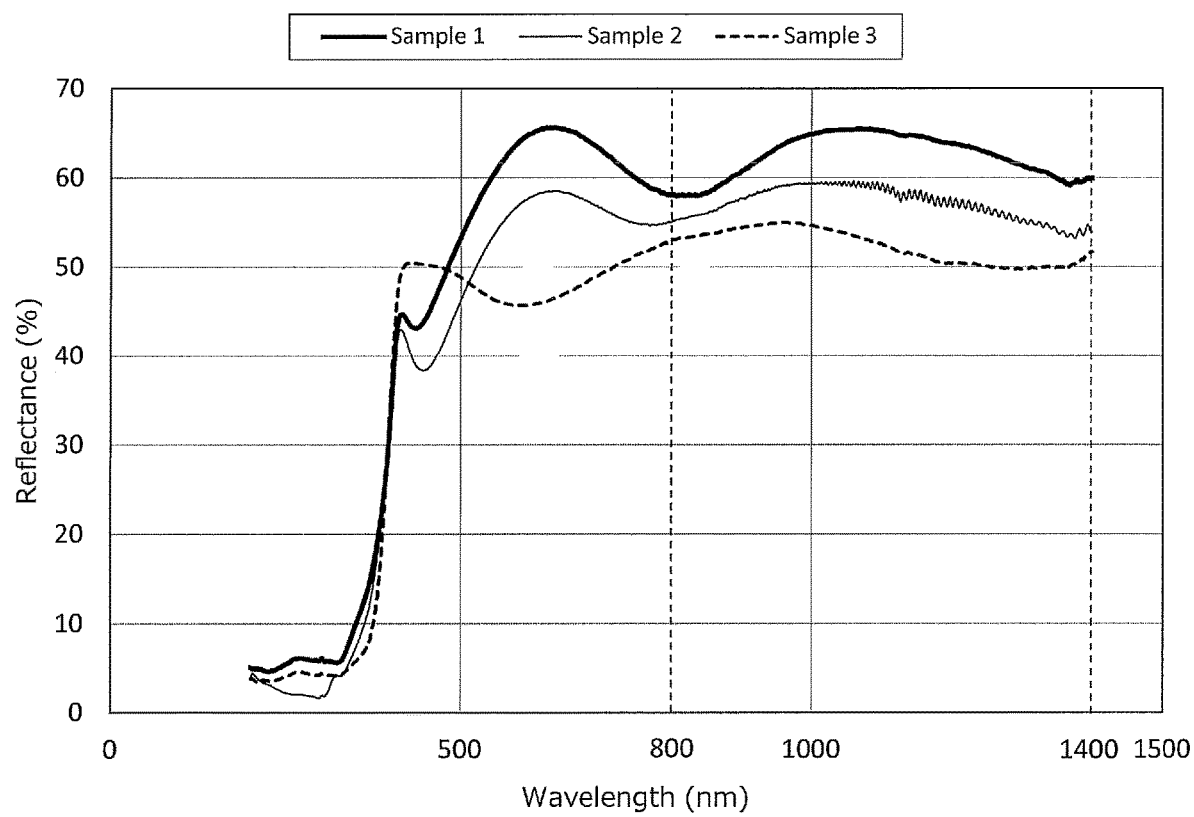
FIG. 7 shows spectral reflectance curves of Sample 1, Sample 2 obtained by attaching fine particles, and Sample 3 obtained by mixing flaky particles having different titanium oxide films with different thicknesses.

Table 1 shows the results. FIGS. 5 to 7 show spectral transmittances of Samples 1 to 10. For Samples 1 to 8, a reflectance of 40% or more was obtained throughout a wavelength region α (800 to 1000 nm) and a wavelength region β (1000 to 1400 nm). For Sample 11 as well, a reflectance of 40% or more was obtained in the wavelength regions α and β. On the other hand, the reflectances of Samples 9 and 10 were less than 40% in the wavelength region β, and the reflectance of Sample 12 was less than 40% in the wavelength region α. Samples 9, 10, and 12 having a sufficiently high lightness L* of reflected light have desirable properties, provided that they are only used to impart a decorative effect. Their near-infrared-shielding abilities are, however, inferior.

TABLE 1

| | Near-infrared-shielding material | | | | | | | | | | | |
|---|---|---|---|---|---|---|---|---|---|---|---|---|
| | Glass flakes | | | | | | | Reflectance | | | | |
| | | Particle | | Thickness of | | | | (near-infrared region) [%] | | | | |
| Sample | Thickness [μm] | diameter [μm] | Ratio | single-layer film [nm] | L* | C* | h | Color type | 800 nm | α | 1000 nm | β | 1400 nm |
| 1 | 0.3 | 15 | 50 | 110 | 56.2 | 29.1 | 84.8 | Orange | 58.1 | A | 64.9 | A | 60.0 |
| 2 | 0.3 | 15 | 50 | 110 + Fine particles | 71.5 | 26.0 | 79.7 | Orange | 55.1 | B | 59.4 | C | 53.9 |
| 3 | 0.5 | 25 | 50 | 110/160/175 | 69.1 | 4.8 | 295.3 | Silver | 52.9 | C | 54.6 | C | 51.7 |
| 4 | 0.4 | 18 | 45 | 110 | 48.8 | 24.4 | 79.8 | Orange | 61.6 | A | 66.7 | A | 60.8 |
| 5 | 0.4 | 10 | 25 | 110 | 48.3 | 21.8 | 85.9 | Orange | 58.1 | B | 56.1 | D | 47.4 |
| 6 | 0.5 | 25 | 50 | 130 | 55.6 | 20.4 | 353.4 | Red | 61.3 | A | 57.9 | C | 53.7 |
| 7 | 0.5 | 25 | 50 | 160 | 38.0 | 29.0 | 266.4 | Blue | 44.0 | F | 52.4 | D | 49.5 |
| 8 | 0.5 | 25 | 50 | 90 | 58.7 | 16.6 | 98.6 | Yellow | 58.1 | C | 50.5 | F | 45.1 |
| 9* | 0.5 | 25 | 50 | 70 | 61.7 | 5.7 | 253.2 | Silver | 51.3 | F | 41.7 | Z | 31.0 |
| 10* | 1.3 | 18 | 14 | 110 | 55.6 | 27.6 | 80.6 | Orange | 44.8 | F | 42.5 | Z | 36.3 |
| 11 | 0.5 | 25 | 50 | 110 | 49.2 | 24.3 | 84.2 | Orange | 53.7 | C | 59.4 | C | 52.4 |
| 12* | 0.5 | 25 | 50 | 170 | 50.7 | 20.9 | 161.4 | Green | 32.1 | Z | 45.1 | F | 52.1 |

Sample 2: with fine particles attached to a single-layer film
Sample 3: a mixture of three types
Samples 9*, 10*, and 12*: Comparative Examples
"Ratio": aspect ratio = average particle diameter/average thickness
"α": wavelengths from 800 to 1000 nm
"β": wavelengths from 1000 to 1400 nm
A: 57% or more;
B: 55% or more;
C: 50% or more;
D: 47% or more;
E: 45% or more;
F: 40% or more;
Z: others D50, namely, the average particle diameter, was determined for Samples 1 to 12 by laser diffractometry. The resulting value was in the range of about ±10% of a value obtained by adding twice the thickness of the single-layer film to the average particle diameter of the glass flakes.

(Application Example: Paint Film)

Coated articles were produced using Samples produced as above and each dispersed in a transparent acrylic resin. A film applicator (Doctor Blade manufactured by YASUDA SEIKI SEISAKUSHO, LTD.) was used to produce the coated articles. A coating composition loaded in the film applicator was prepared by mixing each Sample being a powder with a transparent acrylic resin paint (N Acryl Auto Clear Super manufactured by NIPPON PAINT Co., Ltd.) so that the content of the powder would be 1.0 mass % of the total mass. The coating composition was applied to a PET film (Lumirror (registered trademark) T60 manufactured by Toray Industries, Inc.) and dried at ordinary temperature. The paint film had a thickness of 70 to 80 μm after the drying.

Each of the produced coated articles was placed between an infrared lamp and a measurement object placed to be irradiated with infrared light emitted from the lamp. The coated article was placed such that the distance therefrom to the infrared lamp and the distance therefrom to the measurement object were both 20 cm and the paint film faced the infrared lamp side. An increase in temperature of the measurement object was measured using a thermal camera under irradiation of the measurement object with infrared light emitted from the infrared lamp. The distance between the thermal camera and the measurement object was 20 cm. The measurement was carried out at room temperature. Table 2 shows temperatures obtained after 20 minutes and 60 minutes of infrared light irradiation.

TABLE 2

| Sample | Temperature after 20 minutes (° C.) | Temperature after 60 minutes (° C.) |
|---|---|---|
| 3 | 29.7 | 29.8 |
| 6 | 28.2 | 28.8 |
| 7 | 30.0 | 30.1 |
| 8 | 30.5 | 30.8 |
| 9* | 34.9 | 35.0 |
| 10* | 34.2 | 34.5 |
| 11 | 29.7 | 29.9 |
| 12* | 32.3 | 32.5 |

Samples 9*, 10*, and 12*: Comparative Examples (Application Example: Cosmetic)

W/O milky lotions were each prepared to have composition shown in Table 3 on a mass basis. Specifically, Composition A shown in Table 3 was weighed and heated to be molten. Composition B was added thereto and uniformly dispersed therein. Then, Composition C was added thereto and uniformly dispersed therein. At the end, Composition D was added thereto. The mixture was stirred and then cooled to room temperature to obtain a milky lotion. The near-infrared-shielding material used was Sample 2.

TABLE 3

W/O milky lotion

| Composition | Product name | Component | Sample 11 | Sample 12 | Sample 13 | Sample 14 |
|---|---|---|---|---|---|---|
| A | KF-6048 | Cetyl PEG/PPG-10/1 dimethicone | 4.00 | 4.00 | 4.00 | 4.00 |
|  | Nomucoat HK-G | Glyceryl behenate/eicosadioate | 0.40 | 0.40 | 0.40 | 0.40 |
|  | Eldew PS-203 | Phytosteryl/octyldodecyl lauroyl glutamate | 0.65 | 0.65 | 0.65 | 0.65 |
|  | Squalane | Same as on the left | 2.65 | 2.65 | 2.65 | 2.65 |
|  | ESTEMOL N-01 | Neopentylglycol dicaprate | 4.00 | 4.00 | 4.00 | 4.00 |
|  | KF-56A | Diphenylsiloxy phenyl trimethicone | 9.35 | 9.35 | 9.35 | 9.35 |
|  | Tocopherol 100 | Tocopherol | 0.07 | 0.07 | 0.07 | 0.07 |
|  | Propylparaben | Same as on the left | 0.09 | 0.09 | 0.09 | 0.09 |
| B | KSG-16 | Dimethicone/vinyl dimethicone crosspolymer, dimethicone | 3.35 | 3.35 | 3.35 | 3.35 |
|  | KF-96A 2cs | Dimethicone | 4.00 | 4.00 | 4.00 | 4.00 |
|  | KF-995 | Cyclopentasiloxane | 2.00 | 2.00 | 2.00 | 2.00 |
| C | Near-infrared-shielding material |  | — | 1.00 | 3.00 | 5.00 |
| D | BG | 1,3-Butyleneglycol | 8.00 | 8.00 | 8.00 | 8.00 |
|  | Concentrated glycerin | Glycerin | 2.00 | 2.00 | 2.00 | 2.00 |
|  | Methylparaben | Same as on the left | 0.25 | 0.25 | 0.25 | 0.25 |
|  | Sodium chloride | Same as on the left | 1.35 | 1.35 | 1.35 | 1.35 |
|  | Purified water | Water | Rest | Rest | Rest | Rest |

The manufacturers of the products are as follows.
"KF-6048" (Shin-Etsu Silicones)
"Nomucoat HK-G" (The Nisshin OilliO Group, Ltd.)
"Eldew PS-203" (Ajinomoto Healthy Supply Co., Inc.)
"Squalane" (Nikko Chemicals Co., Ltd.)
"ESTEMOL N-01" (The Nisshin OilliO Group, Ltd.)
"KF-56A" (Shin-Etsu Chemical Co., Ltd.)
"Tocopherol 100" (The Nisshin OilliO Group, Ltd.)
"KSG-16" (Shin-Etsu Chemical Co., Ltd.)
"KF-96A 2cs" (Shin-Etsu Silicones)
"KF-995" (Shin-Etsu Chemical Co., Ltd.)

Figure 8:
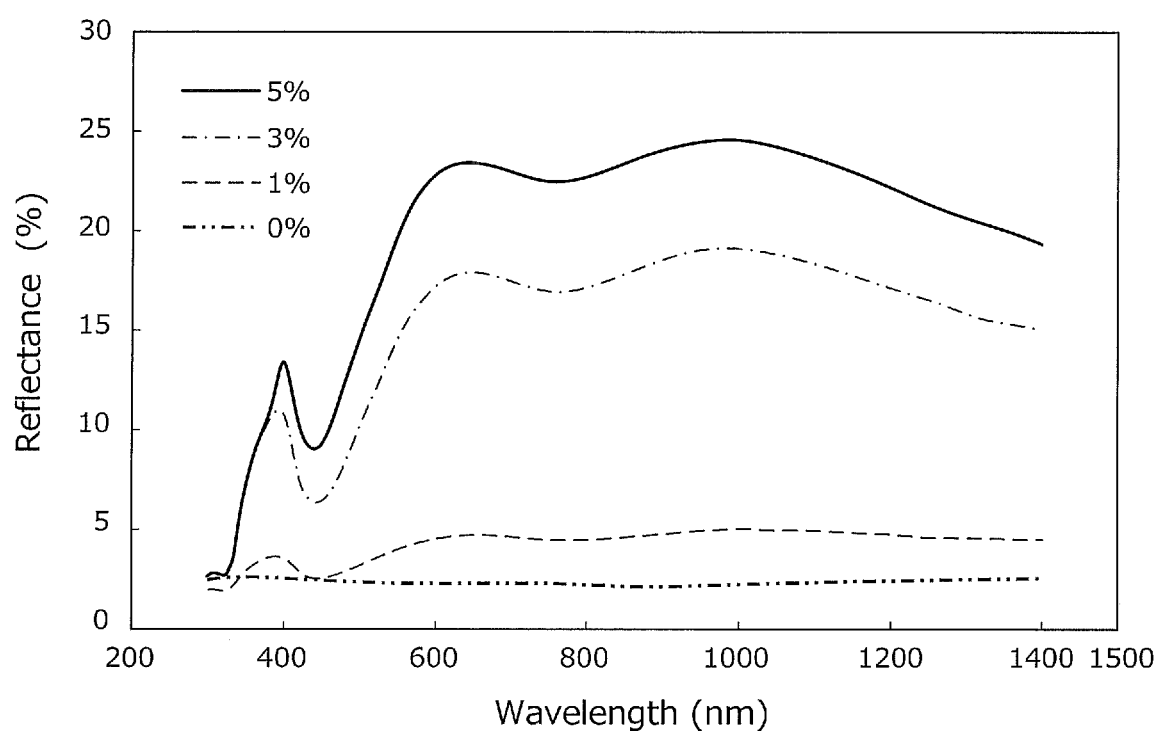
FIG. 8 shows spectral reflectance curves measured for Sample 11 (near-infrared-shielding material: 0%), Sample 12 (": 1%), Sample 13 (": 3%), and Sample 14 (": 5%) being milky lotions.

Sample 13 (near-infrared-shielding material: 0%), Sample 14 (": 1%), Sample 15 (": 3%), and Sample 16 (": 5%) being the obtained milky lotions were measured for spectral reflectances in the same manner as described above. FIG. 8 shows the results.

The invention claimed is:

1. A near-infrared-shielding material comprising a plurality of flaky particles, wherein
each of the plurality of flaky particles comprises a flaky substrate and a single-layer film formed on a principal surface of the flaky substrate,
each of the plurality of flaky particles does not include a metal particle or a non-metal particle attached to an interface between the flaky substrate and the single-layer film and to a surface of the single-layer film,
the flaky substrate has an average thickness of 0.1 μm to 0.6 μm, and
the flaky substrate is a glass flake,
the single-layer film comprises titanium oxide,
the single-layer film has an average thickness of 95 nm to 140 nm, and
the near-infrared-shielding material has a light reflectance of 40% or more between wavelengths of 800 nm and 1400 nm.

2. The near-infrared-shielding material according to claim 1, wherein the flaky substrate has an aspect ratio of 40 or more.

3. The near-infrared-shielding material according to claim 1, wherein the single-layer film has an average thickness of 100 nm to 120 nm.

4. A near-infrared-shielding material comprising a plurality of flaky particles, wherein
each of the plurality of flaky particles comprises a flaky substrate and a single-layer film formed on a principal surface of the flaky substrate,
each of the plurality of flaky particles does not include a metal particle or a non-metal particle attached to an interface between the flaky substrate and the single-layer film and to a surface of the single-layer film,
the flaky substrate is a glass flake,
the glass flake has an average thickness of 0.6 μm or less,
the single-layer film comprises titanium oxide, and
the single-layer film has an average thickness of 95 nm to 140 nm.

5. The near-infrared-shielding material according to claim 4, wherein the glass flake has an aspect ratio of 40 or more.

6. The near-infrared-shielding material according to claim 4, wherein the single-layer film has an average thickness of 100 nm to 120 nm.

7. A near-infrared-shielding composition comprising the near-infrared-shielding material according to claim 1.

8. A cosmetic comprising the near-infrared-shielding material according to claim 1.

9. A paint comprising the near-infrared-shielding material according to claim 1.

10. A painted article comprising the near-infrared-shielding material according to claim 1.

11. A near-infrared-shielding composition comprising the near-infrared-shielding material according to claim 4.

12. A cosmetic comprising the near-infrared-shielding material according to claim 4.

13. A paint comprising the near-infrared-shielding material according to claim 4.

14. A painted article comprising the near-infrared-shielding material according to claim 4.

15. The near-infrared-shielding material according to claim 1, wherein
a reflected color produced by the near-infrared-shielding material is expressed by a C* value of 10 or more in an L*C*h color system, and (i) or (ii) is satisfied:
(i) the reflected color is expressed by an h value of 45 to 88 in the L*C*h color system;
(ii) the reflected color is expressed by an h value of 0 or more and less than 45 or an h value of 315 or more and less than 360 in the L*C*h color system.

16. The near-infrared-shielding material according to claim 4, wherein
a reflected color produced by the near-infrared-shielding material is expressed by a C* value of 10 or more in an L*C*h color system, and
(i) or (ii) is satisfied:
(i) the reflected color is expressed by an h value of 45 to 88 in the L*C*h color system;
(ii) the reflected color is expressed by an h value of 0 or more and less than 45 or an h value of 315 or more and less than 360 in the L*C*h color system.

* * * * *